Oct. 15, 1929.  A. VON SCHAUBERT  1,731,955
PROTECTIVE ARRANGEMENT
Filed July 15, 1927
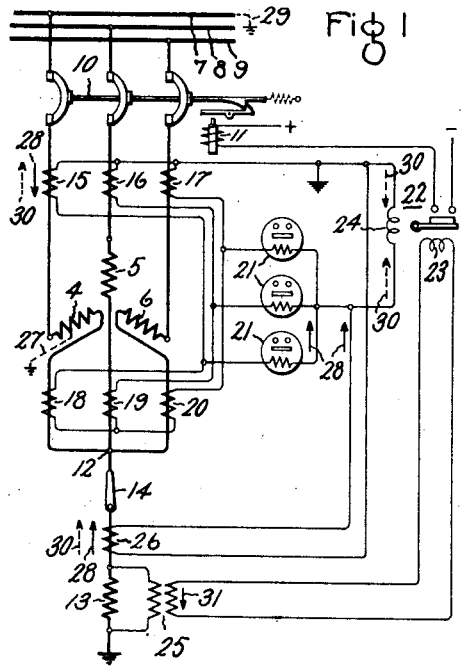
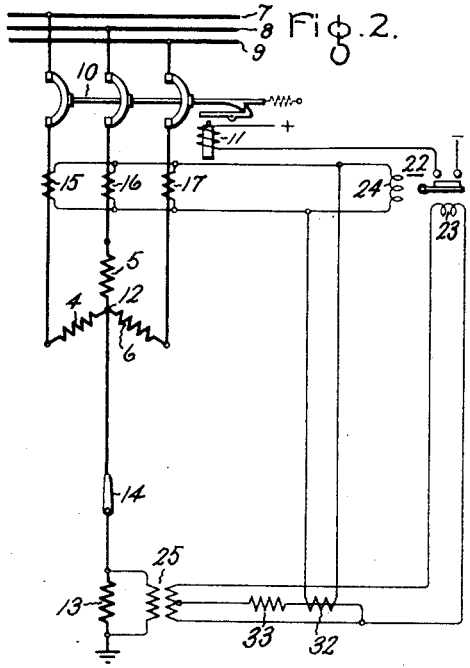
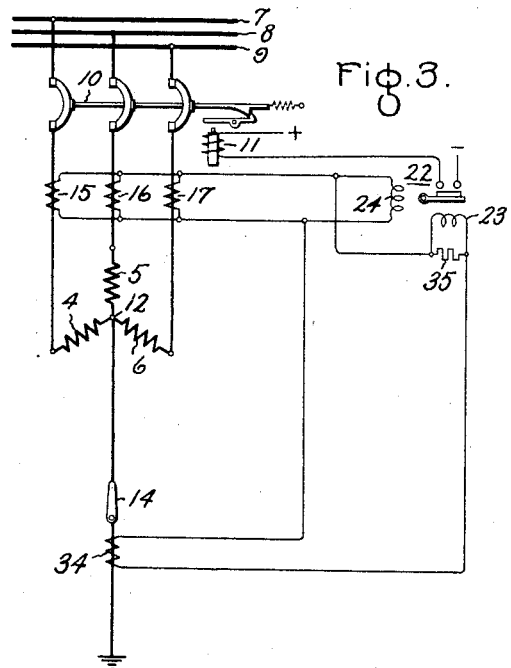
Inventor:
Alexander v. Schaubert
by Alexander S. Lunn
His Attorney.

Patented Oct. 15, 1929

1,731,955

UNITED STATES PATENT OFFICE

ALEXANDER von SCHAUBERT, OF BERLIN, GERMANY, ASSIGNOR TO GENERAL ELECTRIC COMPANY, A CORPORATION OF NEW YORK

PROTECTIVE ARRANGEMENT

Application filed July 15, 1927, Serial No. 206,065, and in Germany August 5, 1926.

My invention relates to improvements in protective arrangements for electric circuits and more particularly to the protection of electric circuits and apparatus on the occurrence of ground faults, and an object of my invention is to provide an improved arrangement for protecting electric circuits and apparatus against ground faults.

In order to avoid damage on the occurrence of a ground fault on the windings of electric apparatus such as a generator, the earth leakage or ground fault current should not exceed a predetermined value even during the time which the ground fault protective apparatus requires to function. This protective apparatus must therefore be responsive to a sufficiently small ground fault current. If this current, however, as is often the case in large generators, is only a very small fraction of the normal load current, the unavoidable differences in the protective transformers connected to provide a current proportional to the ground fault current have a disturbing effect. These differences may be magnetic inequalities in the transformers, stray field effects and unequal impedances of the secondary circuits. Consequently, even under the influence of normal load currents, a false current tending to effect the operation of the ground fault protective apparatus may occur and on the occurrence of a ground fault outside the protected zone may cause the disconnection of the generator.

In accordance with my invention, these false currents are rendered ineffective by means of suitable connections of protective transformers and relays whereby the grounding resistance of each generator can be dimensioned in accordance with the operation of its own relay without regard to the operation of the other generators.

My invention will be better understood from the following description when considered in connection with the accompanying drawing and its scope will be pointed out in the appended claims.

In the accompanying drawing, Fig. 1 illustrates diagrammatically an embodiment of my invention as applied to the protection of a three phase generator and Figs. 2 and 3 illustrate diagrammatically modifications of my invention.

In these figures, electrical apparatus such as a generator has windings 4, 5, 6 which are connected in star and which are arranged to be connected to the conductors 7, 8, 9 respectively of an electric circuit by suitable connecting means such as a circuit breaker 10. This is shown as of the latched closed type having a trip coil 11. The neutral 12 of the generator may be connected to ground through a suitable impedance such as a resistor 13 or directly and a disconnecting switch 14 may be provided in the neutral to ground connection.

As shown in Fig. 1, the geenrator is provided with a known form of differential protection comprising two current transformer groups 15, 16, 17 and 18, 19, 20 and relays 21. In accordance with my invention, I provide means such as a relay 22 for so controlling the circuit breaker 10 as to effect the opening thereof on the occurrence of a ground fault only on the generator windings. The relay 22 may be of the dynamometer or induction disk directional types, examples of which are well known to the art, and as shown schematically comprises two cooperating windings 23, 24. The winding 23 is arranged to be energized in accordance with the current in the neutral to ground connection as by a potential transformer 25 whose primary is connected across the resistor 13 and therefore has an electromotive force dependent on the current in the resistor. The winding 24 is arranged to be energized in accordance with the difference between the residual currents in the conductors of the circuit at two points thereof as for example on each side of the generator windings. For this purpose the winding 24 may be connected in the residual circuit of the parallel connected secondaries of the transformers 15, 16, 17 and also across the secondary of a current transformer 26 in the neutral to ground connection. The connections are such that on the occurrence of an earth leakage, any current appearing in the current transformer 26 so energizes the winding 24 as to cause it to cooperate with the winding 23 in a manner to tend to effect the operation of the relay 22 and thereby the opening of the circuit breaker 10 while the residual current of the current transformers 15, 16, 17 on the occurrence of a ground fault outside the zone between these transformers and the transformer 26 so energizes the winding 24 as to cause it to cooperate with the winding 23 in a manner to restrain the relay 22 from operating to open the circuit breaker.

In case of a ground fault in the protected zone, no residual or earth leakage current appears in the current transformer group 15, 16, 17 when there are not other sources than the generator shown, when the circuit breaker 10 is open or when other sources operating in parallel or other neutrals are not grounded. If now the transformers 15, 16, 17, and 26 have the same transformation ratio and if all have identical characteristics, then on the occurrence of a ground fault outside the protected zone no current will appear in the relay coil 24 since the residual currents on each side of the generator are substantially equal and in the same direction so that their difference is substantially zero.

In accordance with my invention, the relay winding 24 is arranged to be energized on the occurrence of a ground fault outside the protected zone by a current in a direction to restrain the relay 22 against operation. One way to obtain the desired current is to proportion the transformation ratios of the current transformer group 15, 16, 17 and the current transformer 26 so that the former, assumed as having a higher ratio, tend to cause a greater residual current to appear in the winding 24 than does the latter on the occurrence of a ground fault outside the protected zone. By suitable selection of the transformation ratios this excess difference current can be made sufficiently great to prevent erroneous operation of the relay 22 in case of ground faults even when the generator is heavily loaded since the effect of false currents due to lack of balance in transformer characteristics may be compensated or over-compensated.

Assuming a fault to ground on the generator winding 4 as indicated at 27, that the circuit breaker 10 is closed, and that another source with a grounded neutral is connected to the circuit 7, 8, 9, then ground fault currents appear in the current transformers 15 and 26 in the relative directions indicated by the arrows 28. In this case the vector difference between these currents is in effect their arithmetic sum since they are substantially in phase opposition. This difference appears in the relay winding 24 as is obvious and in conjunction with the current in the winding 23 effects the operation of the relay 22 and thereby the opening of the circuit breaker 10.

Assuming an external ground fault as on the conductor 7 at 29 and that the circuit breaker 10 is closed, then ground fault currents appear in the current transformers 15 and 26 in the relative directions indicated by the arrows 30. In this case the vector difference is substantially zero if the transformation ratios are equal and no false currents appear, but if the transformation ratio of the current transformer 15 is greater than that of the current transformer 26, a difference current appears in the relay winding 24 in a direction to prevent operation of the relay. In each case described, the relative direction of the current in the winding 23 is the same and may be assumed to be represented by the arrow 31. It is of course to be understood that the arrows are intended to represent only relative directions of currents in the relay windings. With a ground on the generator as indicated at 27, the relay 22 will operate without the circuit breaker 10 being closed. This prevents a defective generator from being connected to the circuit conductors 7, 8, 9. The sensitiveness of the relay 22 under the most unfavorable case, that is, an internal ground fault as at 27 without feed-back from the circuit conductors 7, 8, 9, is of course dependent on the size of the resistor 13. The utilization of the sensitiveness thus available is made possible by compensating for the effect of the false current by the described selection of the transformation ratios of the current transformers.

In the arrangement shown in Fig. 2, the current transformer 26 of Fig. 1 is replaced by transforming means 32 connected in circuit with the secondary of the potential transformer 25 across a tap thereof as shown and through suitable phase displacing means. This is shown as comprising a resistor 33 for ensuring that the residual current supplied by the transforming means 32 to the relay winding 24 has the proper phase relation relatively to the residual current supplied to the relay winding 24 by the parallel connected current transformers 15, 16, 17. Here again the connections are such that the relay winding 24 is energized in accordance with the difference between the residual currents in the circuit on each side of the generator windings. Also the effective transformation ratios of the transformers 15, 16, 17 and 32 may be such that the transformers 15, 16, 17 supply a greater current than does the transformer 32.

In the modification of my invention shown in Fig. 3, the potential transformer 25 is not used, but a current proportional to the residual or ground fault current on the neutral side of the generator is provided through a current transformer 34 which energizes both windings 23 and 24 of the relay 22. Here again the connections are such that the difference between the residual currents supplied by the parallel connected transformers 15, 16, 17 and the transformer 34 energizes the relay winding 24. Also the transformation ratios may be so proportioned that the transformers 15, 16, 17 supply a restraining residual current on external ground faults. If the relay 22 is of the induction disk type, suitable phase displacing means, shown as comprising a resistor 35 in parallel with the relay winding 23, may be used.

While I have shown three separate current transformers 15, 16, 17 for obtaining the residual current on one side of the generator, it will be apparent that any other suitable means such as a summation transformer of the single core so-called sheath type may be used. Although the grounding impedance means is shown as a resistor, inductances, capacitances, resistances, or combinations thereof may be employed as is well-known. In any case, the relay 22, being a directional relay, may instead of operating on the effective power component operate on the reactive power component.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. A protective arrangement for an electric circuit having a grounded neutral including a relay having two cooperating windings one of which is connected to be energized in accordance with the current in the neutral to ground connection, means for energizing the other of said windings in accordance with the difference between the residual currents of said circuit at two points thereof including current transformers having their ratios proportioned to provide a difference current in a direction to restrain the relay against operation on the occurrence of a ground fault outside the zone between said points.

2. A protective arrangement for an electric circuit having a grounded neutral including a directional relay having two cooperating windings one of which is connected to be energized in accordance with the current in the neutral to ground connection, and means connected and arranged to energize the other of said windings in accordance with the difference between the residual currents of said circuit at two points thereof, said means being arranged to provide on the occurrence of a ground fault outside the zone between said points a difference current in a direction to restrain the relay against operation.

3. A protective arrangement for an electric circuit having a grounded neutral including a relay having two cooperating windings respectively connected to be energized in accordance with the current in the neutral to ground connection and the difference between the residual currents at two points of the circuit, and means for further energizing one of the windings to restrain the relay against operation on the occurrence of a ground fault outside a zone between said points.

4. A protective arrangement for an electric circuit having a grounded neutral including a relay having two cooperating windings one of which is connected to be energized in accordance with the current in the neutral to ground connection, means connected and arranged to energize the other of said windings in accordance with the difference between the residual currents in the conductors of the circuit at two points thereof, and means for energizing said other winding to restrain the relay against operation on the occurrence of a ground fault outside the zone between said points.

5. In combination with a three phase circuit and a generator having star connected windings, means for connecting the generator windings to the respective conductors of the circuit, a connection between the neutral of said windings and ground, and means for effecting the opening of the connecting means only on the occurrence of a ground fault on the generator including a directional relay arranged to control said connecting means and having two cooperating windings, one being connected to be energized in accordance with the current in the neutral to ground connection, and means for energizing the other of said relay windings in accordance with the difference between the residual currents in the conductors on each of the generator windings including current transforming means associated with the conductors on each side of the generator windings, the transforming means on the supply side of the generator windings having a higher transformation ratio than the transforming means on the neutral side of the generator windings.

In witness whereof, I have hereunto set my hand this 21st day of June, 1927.

ALEXANDER von SCHAUBERT.